United States Patent
Choi et al.

(10) Patent No.: US 7,983,639 B2
(45) Date of Patent: Jul. 19, 2011

(54) RF FILTER AND DIGITAL BROADCAST RECEIVING TUNER AND RF SIGNAL PROCESSING DEVICE USING RF FILTER

(75) Inventors: Kyu-don Choi, Yongin-si (KR); Choong-yul Cha, Yongin-si (KR); Heung-bae Lee, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 670 days.

(21) Appl. No.: 11/765,479

(22) Filed: Jun. 20, 2007

(65) Prior Publication Data

US 2008/0182535 A1    Jul. 31, 2008

(30) Foreign Application Priority Data

Jan. 25, 2007    (KR) .................. 10-2007-0008027

(51) Int. Cl.
*H04B 1/10* (2006.01)
*H04B 1/16* (2006.01)

(52) U.S. Cl. .................. 455/213; 455/339; 455/3.01

(58) Field of Classification Search .................. 455/3.01, 455/3.02, 3.06, 552.1, 550.1, 311, 339, 341, 455/213, 306
See application file for complete search history.

(56) References Cited

U.S. PATENT DOCUMENTS

| | | | | |
|---|---|---|---|---|
| 5,369,470 A * | 11/1994 | Hansen | ........................ | 455/296 |
| 5,530,923 A * | 6/1996 | Heinonen et al. | ............. | 455/126 |
| 5,909,643 A * | 6/1999 | Aihara | ........................ | 455/127.3 |
| 6,070,063 A * | 5/2000 | Yoshizawa et al. | ........ | 455/234.1 |
| 6,313,698 B1 * | 11/2001 | Zhang et al. | .................... | 330/51 |
| 6,927,646 B2 * | 8/2005 | Niemi | ........................ | 333/101 |
| 7,167,688 B2 * | 1/2007 | Li et al. | .......................... | 455/88 |
| 7,171,235 B2 * | 1/2007 | Haapoja | .................... | 455/553.1 |
| 7,212,796 B2 * | 5/2007 | Okanobu | .................. | 455/234.1 |

\* cited by examiner

*Primary Examiner* — Sonny Trinh
(74) *Attorney, Agent, or Firm* — Sughrue Mion, PLLC

(57) ABSTRACT

A radio frequency (RF) filter is provided which includes a band pass filter unit and an amplifying unit. If a signal having a frequency in a first band is input, the RF filter performs band pass filtering, and if a signal having a frequency in a second band is input, the RF filter performs an amplifying process. The RF filter can be used for various RF signal processing devices, such as digital broadcast receiving tuners.

16 Claims, 7 Drawing Sheets

RF FILTER AND DIGITAL BROADCAST RECEIVING TUNER AND RF SIGNAL PROCESSING DEVICE USING RF FILTER

CROSS-REFERENCE TO RELATED APPLICATIONS

This application claims priority under 35 U.S.C. §119 from Korean Patent Application No. 10-2007-0008027, filed on Jan. 25, 2007, in the Korean Intellectual Property Office, the disclosure of which is incorporated herein by reference in its entirety.

BACKGROUND OF THE INVENTION

1. Field of the Invention

Apparatuses consistent with the present invention relate to a radio frequency (RF) filter and a digital broadcast receiving tuner, and an RF signal processing device using the RF filter. More particularly, apparatuses consistent with the present invention relate to an RF filter, and a digital broadcast receiving tuner and an RF signal processing device using the RF filter in which band pass filtering can be performed on only a signal having a predetermined frequency or less to supply the filtered signal to a mixer.

2. Description of the Related Art

With development of electronic techniques, various systems for transmitting and receiving signals in a broadband have been realized and are being used. An example of those systems is a digital broadcast system.

In case of a broadband frequency signal processing system, when a user selects a specific frequency channel which the user wants to receive, the system receives signals through the selected channel. In this case, the harmonics of the channel also may be received as noise.

When a channel of 100 MHz is selected, a signal of 300 MHz, which is the third harmonic component of the selected channel, may be mixed with a local oscillator (LO) spectrum of 300 MHz to be converted to 100 MHz. A ratio of an actually wanted signal to noise may be reduced.

FIG. 1 is a graph illustrating an output power characteristic of an RF signal processing device according to the related art. Referring to FIG. 1, harmonic noise components are more than actually wanted signal components in the power spectral density.

In order to solve this problem, an attempt to realize a passive filter using various kinds of external elements, such as a varactor diode and an inductor, was made for removing harmonics. More specifically, a varactor whose capacitance varies was used to change an oscillation frequency according to voltage variation, thereby performing filtering on n-th ($3^{rd}$, $5^{th}$, $7^{th}$, $9^{th}$, or the like) harmonics of an input signal. In this way, an amount of inflow noise during a mixing operation of a mixer was reduced.

In this case, however, various kinds of external elements are required, resulting in a large size of a module. Further, a feedback path is required to change an input voltage of the varactor, causing power consumption to increase.

In particular, it is required to perform filtering on all of signals in a broad band (about 48 MHz to 870 MHz), resulting in a large amount of power consumption.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a subminiature RF filter which can minimize its power consumption while reducing an amount of noise due to harmonics, and a digital broadcast receiving tuner and RF signal processing device using the RF filter.

According to an aspect of the present invention, an RF filter may comprise: a band pass filter unit which filters an input signal; an amplifying unit which amplifies the input signal; and a switching unit which activates the band pass filter unit if the frequency of the input signal is in a first band and activates the amplifying unit if the frequency of the input signal is in a second band.

In the RF filter, if the frequency of the input signal is equal to or lower than one-third of the maximum frequency of a band which the RF filter can receive, the switching unit may activate the band pass filter, and if the frequency of the input signal is higher than one-third of the maximum frequency, the switching unit may activate the amplifying unit.

For example, if the frequency of the input signal is equal to or lower than about 290 MHz, the switching unit activates the band pass filter, and if the frequency of the input signal is higher than about 290 MHz, the switching unit activates the amplifying unit.

In the RF filter, the switching unit may comprise a first switch which switches the connection status of a first path in which the band pass filter unit is disposed, and a second switch which switches the connection status of a second path in which the amplifying unit is disposed.

Alternatively, the switching unit may comprise: a first switch which is disposed on an upstream side of the band pass filter unit along a first path where the band pass filter unit is disposed; a second switch which is disposed on a downstream side of the band pass filter unit along the first path; a third switch which is disposed on an upstream side of the amplifying unit along a second path where the amplifying unit is disposed; and a fourth switch which is disposed on a downstream side of the amplifying unit along the second path.

In the RF filter, the band pass filter unit may comprise a plurality of band pass filters. In this case, the switching unit may selectively activate one of the plurality of band pass filters if the frequency of the input signal is in the first band.

According to another aspect of the present invention, there is provided a digital broadcast receiving tuner comprising: an RF filter which filters an input signal if the frequency of the input signal is in a first band, and amplifies the input signal if the frequency of the input signal is in a second band; and a harmonic rejection mixer which mixes an output signal of the RF filter with a local oscillator (LO) spectrum.

In the digital broadcast receiving tuner, the RF filter may comprise at least one band pass filter unit, an amplifying unit, and a switching unit which activates the band pass filter unit if the frequency of the input signal is in the first band, and activates the amplifying unit if the frequency of the input signal is in the second band, and the harmonic rejection mixer may mix a signal output from one of the band pass filter unit and the amplifying unit with the LO spectrum.

The digital broadcast receiving tuner may further comprise a controller which controls the switching unit according to which channel a user selects.

In the digital broadcast receiving tuner, if the frequency of the input signal is equal to or lower than one-third of the maximum frequency of a band which the RF filter can receive, the RF filter may perform filtering, and if the frequency of the input signal is higher than one-third of the maximum frequency, the RF filter may perform amplifying process.

For example, if the frequency of the input signal is equal to or lower than about 290 MHz, the RF filter may perform filtering, and if the frequency of the input signal is higher than about 290 MHz, the RF filter may perform amplifying process.

In the digital broadcast receiving tuner, the switching unit may comprise a first switch which switches the connection status of a first path in which the band pass filter unit is disposed, and a second switch which switches the connection status of a second path in which the amplifying unit is disposed.

Alternatively, the switching unit may comprise: a first switch which is disposed on an upstream side of the band pass filter unit along a first path where the band pass filter unit is disposed; a second switch which is disposed on a downstream side of the band pass filter unit along the first path; a third switch which is disposed on an upstream side of the amplifying unit along a second path where the amplifying unit is disposed; and a fourth switch which is disposed on a downstream side of the amplifying unit along the second path.

In the digital broadcast receiving tuner, the band pass filter unit may comprise a plurality of band pass filters. In this case, the switching unit may selectively activate one of the plurality of band pass filters if the frequency of the input signal is in the first band.

According to a further aspect of the present invention, there is provided an RF signal processing device comprising: an RF filter which filters an input signal if the frequency of the input signal is in a first band, and amplifies the input signal if the frequency of the input signal is in a second band; and a harmonic rejection mixer which mixes an output signal of the RF filter with an LO spectrum.

In the RF signal processing device, the RF filter may comprise at least one band pass filter unit, an amplifying unit, and a switching unit which activates the band pass filter unit if the frequency of the input signal is in the first band, and activates the amplifying unit if the frequency of the input signal is in the second band. In this case, the harmonic rejection mixer may mix a signal output from one of the at least one band pass filter unit and the amplifying unit with the LO spectrum.

BRIEF DESCRIPTION OF THE DRAWINGS

Above and other aspects of the present invention will become apparent and more readily appreciated from the following description of the exemplary embodiments, taken in conjunction with the accompany drawings, in which.

DETAILED DESCRIPTION OF EXEMPLARY EMBODIMENTS

Figure 1:
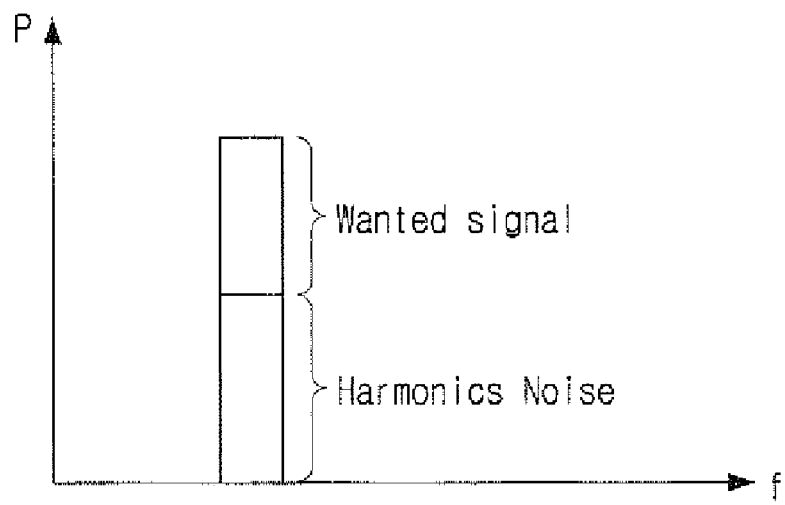
FIG. 1 is a graph illustrating an output power characteristic of an RF signal processing device according to a related art.

Certain exemplary embodiments of the present invention will be described in greater detail with reference to the accompanying drawings.

In the following description, same drawing reference numerals are used for the same elements even in different drawings. The matters defined in the description, such as detailed construction and elements, are provided to assist in a comprehensive understanding of the present invention. Thus, it is apparent that the present invention can be carried out without those specifically defined matters. Also, well-known functions or constructions are not described in detail since they would obscure the invention with unnecessary detail.

FIGS. 2 to 7 are block diagrams for the structures of various RF filters according to exemplary embodiments of the present invention.

Figure 2:
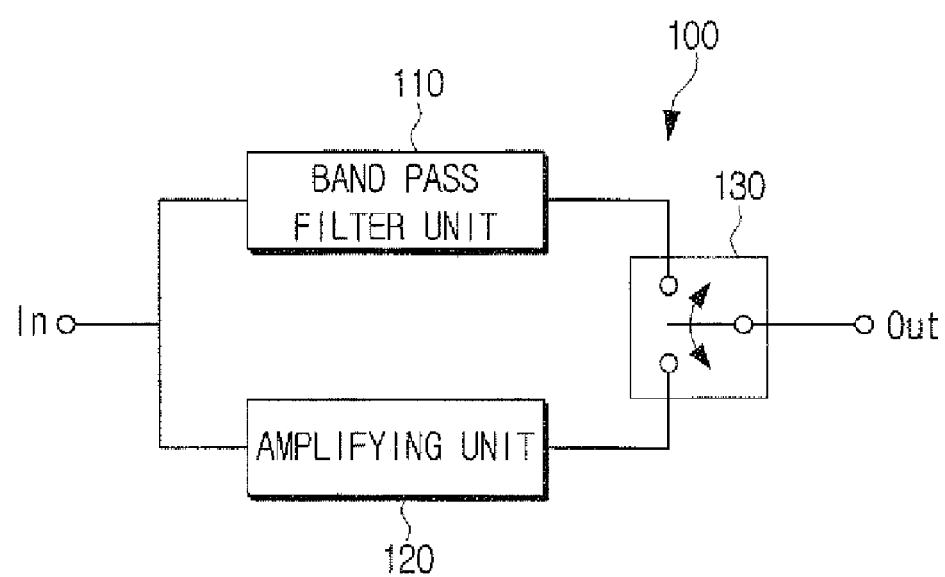
FIGS. 2 to 7 are the structures of various RF filters according exemplary embodiments of the present invention.

First, referring to FIG. 2, an RF filter according to an exemplary embodiment of the present invention includes a band pass filter unit 110, an amplifying unit 120, and a switching unit 130.

The band pass filter unit 110 and the amplifying unit 120 are disposed along different paths.

The switching unit 130 selects one of a path in which the band pass filter unit 110 is disposed and a path in which the amplifying unit 120 is disposed, whereby one of the band pass filter unit 110 or the amplifying unit 120 is activated and the other thereof is inactivated.

When the band pass filter unit 110 is activated, it performs band pass filtering on an input signal In and the signal on which band pass filtering has been performed is output to the next stage of the RF filter 100. More specifically, the band pass filter unit 110 passes only components, having frequencies in a frequency band of a channel selected by a user, of the input signal In, and removes the other components from the input signals. The passband of the band pass filter unit 110 may be set through capacitance adjustment. The band pass filter unit 110 may include a plurality of capacitors and a plurality of switches connected to the plurality of capacitors, respectively. In this case, each of the switches may be turned on or off according to the selected channel to adjust the capacitance of the band pass filter unit, whereby the bandwidth and position of the passband are set.

When the amplifying unit 120 is activated, the input signal In is amplified at a gain of the amplifying unit 120 and the amplified signal is output to the next stage of the RF filter 100. The amplifying unit 120 may be composed of a single-ended amplifying circuit using a transistor or a differential amplifying circuit including a plurality of transistors in which every two make a pair.

The switching unit 130 performs switching on the basis of a frequency band to which the input signals correspond. In other words, when the input signal corresponds to a first frequency band, the switching unit activates the band pass filter unit 110, and when the input signal corresponds to a second frequency band, the switching unit activates the amplifying unit 120.

The first and second frequency bands may be set on the basis of one-third of the maximum frequency of a frequency band capable of being input. A broad frequency band is about 48 MHz to 870 MHz. The maximum frequency of the broad frequency band is 870 MHz and one-third of the maximum frequency is 290 MHz. Therefore, when the input signal corresponds to a band equal to or lower than 290 MHz, more specifically, a band from 48 MHz to 290 MHz, the switching unit 130 activates the band pass filter unit 110 to perform filtering, and when the input signal corresponds to a band higher than 290 MHz, the switching unit 130 activates the amplifying unit 120.

When an RF signal having a fundamental frequency of 290 MHz is input, the odd-order harmonics are also received through an RF channel. In other words, 290 MHz (the fundamental frequency), 870 MHz (the $3^{rd}$ harmonic), 1450 MHz (the $5^{th}$ harmonic), or the like are generated. The even-order harmonics, that is, 580 MHz (the $2^{nd}$ harmonic), 1160 MHz (the $4^{th}$ harmonic), or the like can be removed by a differential structure and are thus not considered.

The signal having passed through the RF filter 100 are transmitted to a mixer (not shown) disposed at the next stage of the RF filter 100. The mixer mixes the output signals of the RF filter 100 with a local oscillator (LO) spectrum received from an LO. In this case, the LO spectrum has 290 MHz (the fundamental frequency), 870 MHz (the $3^{rd}$ harmonic), 1450 MHz (the $5^{th}$ harmonic), or the like. The harmonics are mixed. In case of a signal having a frequency equal to or higher than the maximum frequency of 870 MHz, the power of the signal is too low to affect the amount of noise. In other words, in a band for cable television (TV), that is, a band lower than 860 MHz, signals for the cable TV having high power exist, and in a band higher than 860 MHz, no signals for the cable TV but only radio communication signals having relatively low power exist. Accordingly, a signal having a frequency equal to or higher than the maximum frequency of 870 MHz rarely affects the performance of the mixer disposed at the next stage of the RF filter 110.

Therefore, in a band that is equal to or lower than 290 MHz and in which the $3^{rd}$ harmonic matters, the switching unit 130 activates the band pass filter unit 110 to perform band pass filtering. As a result, the $3^{rd}$ harmonic and other harmonics of the input signal are attenuated and the input signal is then output, which reduces the amount of harmonic noise.

In contrast, in a band which is larger than 290 MHz and in which the $3^{rd}$ harmonic does not matter, the switching unit 130 activates the amplifying unit 120 to perform an amplifying process. As a result, it is possible to reduce power consumed in filtering on the whole band.

All of the band pass filter unit 110, the amplifying unit 120, and the switching unit 130 used in the RF filter 100 may be integrated on one chip. Therefore, it is unnecessary to use various external elements for performing filtering on RF signals.

In particular, the band pass filter unit 110 may use a plurality of capacitors and a plurality of switches to adjust a capacitance, thereby determining the passband. Therefore, it is possible to selectively filter harmonics without various kinds of external elements, such as a varactor, and wiring lines for feedback. As a result, it is possible to reduce the size and power consumption of the RF filter 100.

Figure 3:
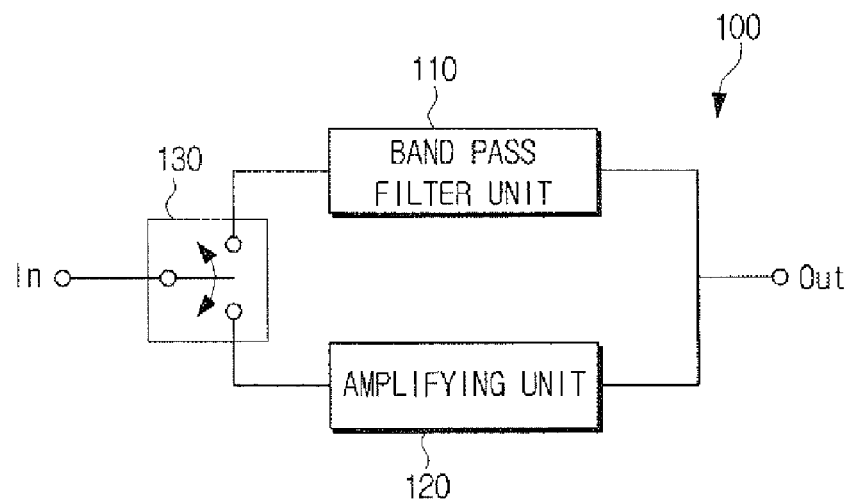

FIG. 3 is a view illustrating an exemplary embodiment having a structure in which the switching unit 130 is disposed at a previous stage of the band pass filter unit 110 and the amplifying unit 120. According to a frequency band to which the input signal corresponds, the switching unit 130 selectively transmits the input signal to the band pass filter unit 110 or the amplifying unit 120. The specific operation of each of the components shown in FIG. 3 is the same as that in FIG. 2 and thus a description thereof will be omitted.

Figure 4:
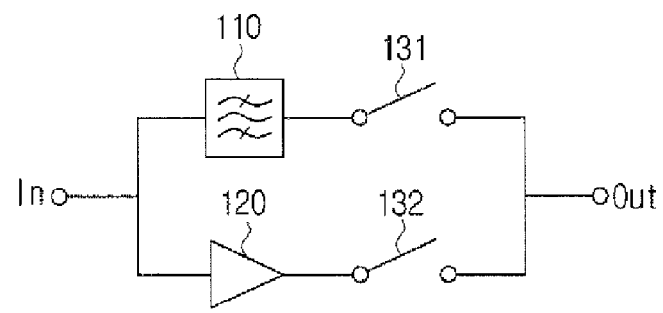

FIG. 4 is a view illustrating an exemplary embodiment having a structure in which the switching unit 130 comprises a plurality of switches 131 and 132 positioned along individual paths. More specifically, a first switch 131 is disposed on one side of the band pass filter unit 110 and activates or inactivates the band pass filter unit 110. Further, a second switch 132 is disposed on one side of the amplifying unit 120 and activates or inactivates the amplifying unit 120.

The first and second switches 131 and 132 operate against each other. More specifically, when the first switch 131 is turned on, the second switch 132 is turned off, and when the first switch 131 is turned off, the second switch 132 is turned on.

Figure 5:
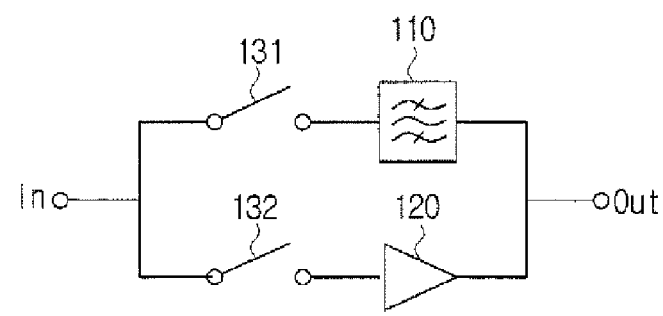

FIG. 5 is a view illustrating an exemplary embodiment having a structure in which first and second switches are disposed at previous stages of the band pass filter unit 110 and the amplifying unit 120, respectively.

Figure 6:
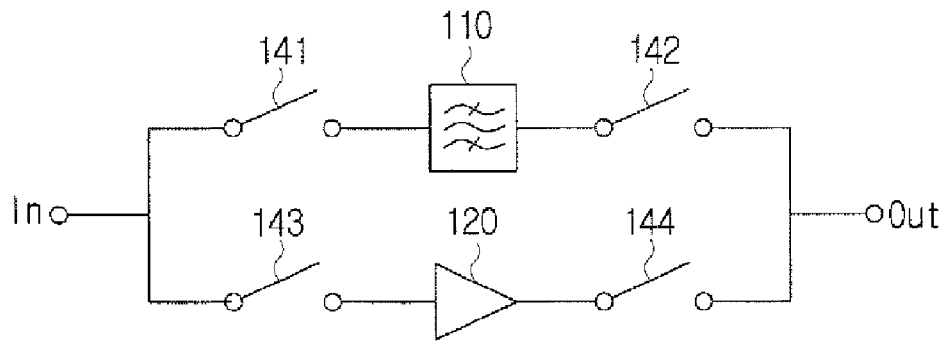

FIG. 6 is a view illustrating an exemplary embodiment having a structure in which the switching unit 130 comprises four switches. More specifically, the switching unit 130 includes a first switch 141 disposed on one side of the band pass filter unit 110, a second switch 142 disposed on the other side of the band pass filter unit 110, a third switch 143 disposed on one side of the amplifying unit 120, and a fourth switch 144 disposed on the other side of the amplifying unit 120.

In this case, the first and second switches 141 and 142 are synchronously turned on or off and the third and fourth switches 143 and 144 are synchronously turned on or off. The first and second switches 141 and 142 operate against the third and fourth switches 143 and 144.

Each of the switches used in the exemplary embodiments shown in FIGS. 4 to 6 may comprise a MOS transistor switch or a bipolar transistor switch.

The switching unit 130 in each of the exemplary embodiments shown in FIGS. 4 to 6 has the structure different from that shown in FIG. 2 but operates in the same way as that shown in FIG. 2, thus a description thereof will be omitted.

Figure 7:
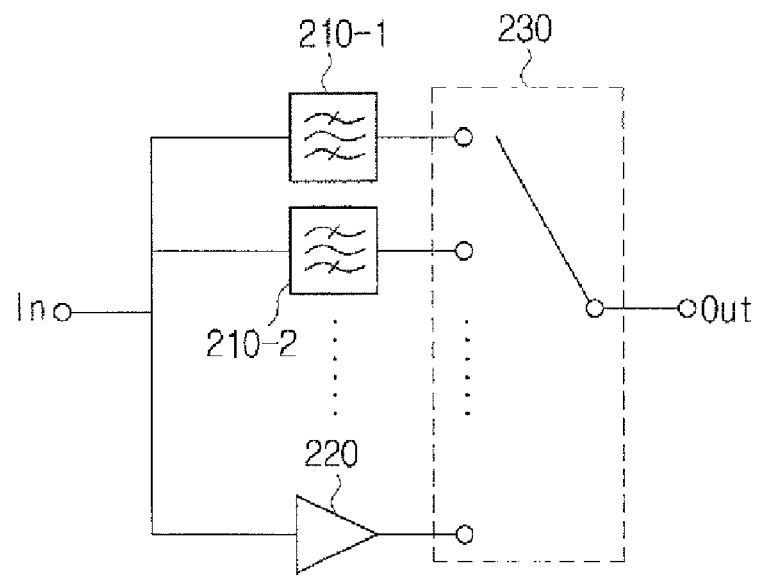

FIG. 7 is a view illustrating an RF filter using a plurality of band pass filter units 210-1, 210-2, . . . .

Each of the band pass filter units 210-1, 210-2, . . . has a passband different from one another. According to a frequency band to which an input signal corresponds, a switching unit 230 selects one of the band pass filter units 210-1, 210-2, . . . . In this case, in regard to a signal having a frequency exceeding one-third of the maximum frequency of the frequency band to which the input signal corresponds, the switching unit 230 selects an amplifying unit 220 to amplify and output the corresponding signal. The other operation of the RF filter shown in FIG. 7 is the same as that shown in FIG. 2 and thus a description thereof will be omitted.

Figure 8:
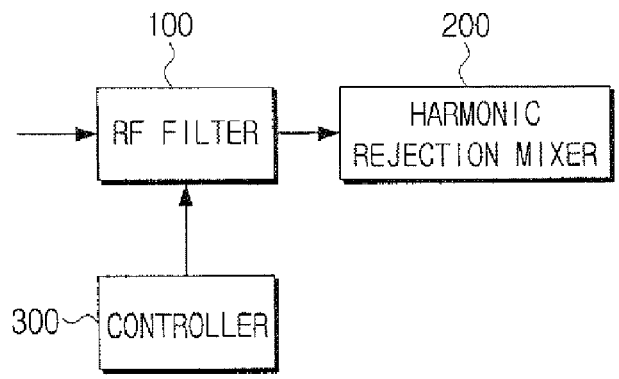
FIG. 8 is a block diagram illustrating the structure of an RF signal processing device according to an exemplary embodiment of the present invention.

FIG. 8 is a block diagram illustrating the structure of an RF signal processing device according to an exemplary embodiment of the present invention. Referring to FIG. 8, an RF signal process device includes an RF filter 100, a harmonic rejection mixer 200, and a controller 300. Any one of the RF filters shown in FIGS. 2 to 7 can be used as the RF filter 100 in the present exemplary embodiment.

The controller 300 controls the operation of the RF filter 100 according to a frequency channel selected by the user. More specifically, the controller 300 controls the RF filter 100 to perform a band pass filtering process or an amplifying process according to a band to which an input signal corresponds and output the processed signal to the harmonic rejection mixer 200.

When the RF filter 100 is a chip capable of directly controlling a switching function, the controller 300 may inform the RF filter 100 of the band to which the input signal corresponds and the RF filter 100 may be formed to be capable of performing a band pass filtering process or an amplifying process.

The harmonic rejection mixer 200 mixes the output signal of the RF filter 100 with an LO spectrum, thereby performing down conversion. As a result, the input RF signal is converted into an IF (intermediate frequency) signal.

In this case, a band pass filtering process is performed on an input signal in a band equal to or lower than 290 MHz and the processed signal are input to the harmonic rejection mixer 200. Then, the harmonic rejection mixer 200 mixes the signal output from the RF filter 100 with the LO spectrum, whereby an amount of inflow harmonics is reduced. A harmonic rejection mixer 200 is well known and thus a description thereof will be omitted.

Figure 9:
FIGS. 9 to 12 are graphs illustrating a signal processing process of the RF signal processing device shown in FIG. 8, according to an exemplary embodiment of the present invention.

FIGS. 9 to 12 are views schematically illustrating the power spectral densities of a signal processed by the RF signal processing device shown in FIG. 8. FIG. 9 shows the power spectral density of an RF signal input to the RF filter 100.

Figure 10:
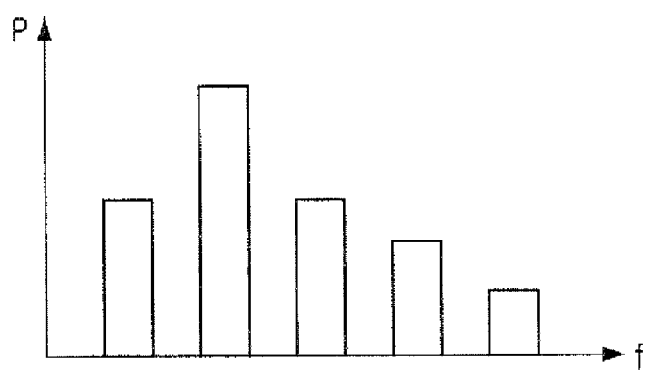

When a selected channel belongs to a first frequency band, the RF filter 100 performs a band pass filtering process such that neighboring frequency signals may be attenuated. FIG. 10 shows the power spectral density of the signal on which the band pass filtering has been performed by the RF filter 100. As shown in FIG. 10, only the power of the harmonic in the band of the selected channel is maintained and the power of the other harmonics is attenuated.

Figure 11:
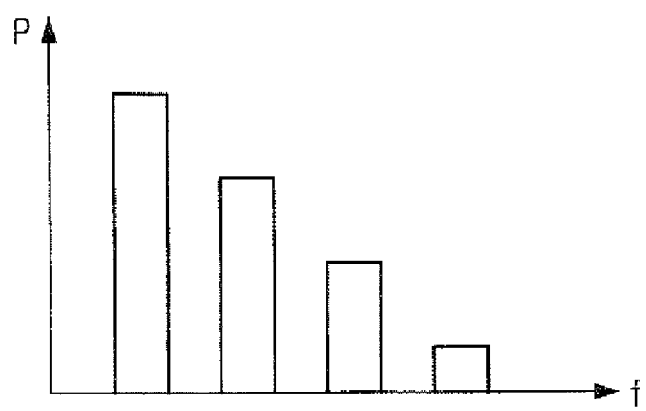

FIG. 11 shows the LO spectrum input to the harmonic rejection mixer 200. In the LO spectrum, the power of the fundamental band of the selected frequency channel is the maximum and the powers of the harmonics are relatively small.

Figure 12:
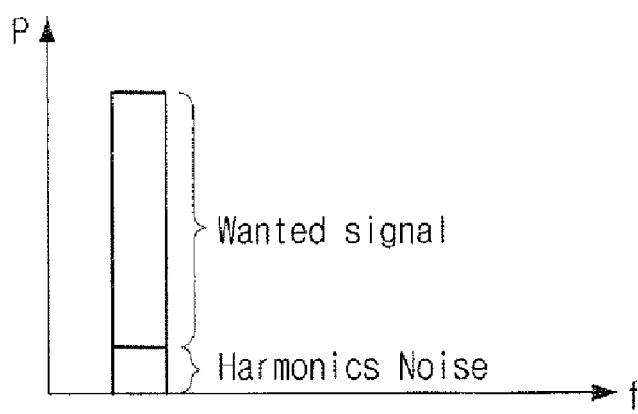

FIG. 12 shows the power spectral density of the output signal of the harmonic rejection mixer 200. From FIG. 12, it can be seen that, as the amount of inflow harmonics decreases by the band pass filtering, an amount of harmonic noise decreases.

Figure 13:
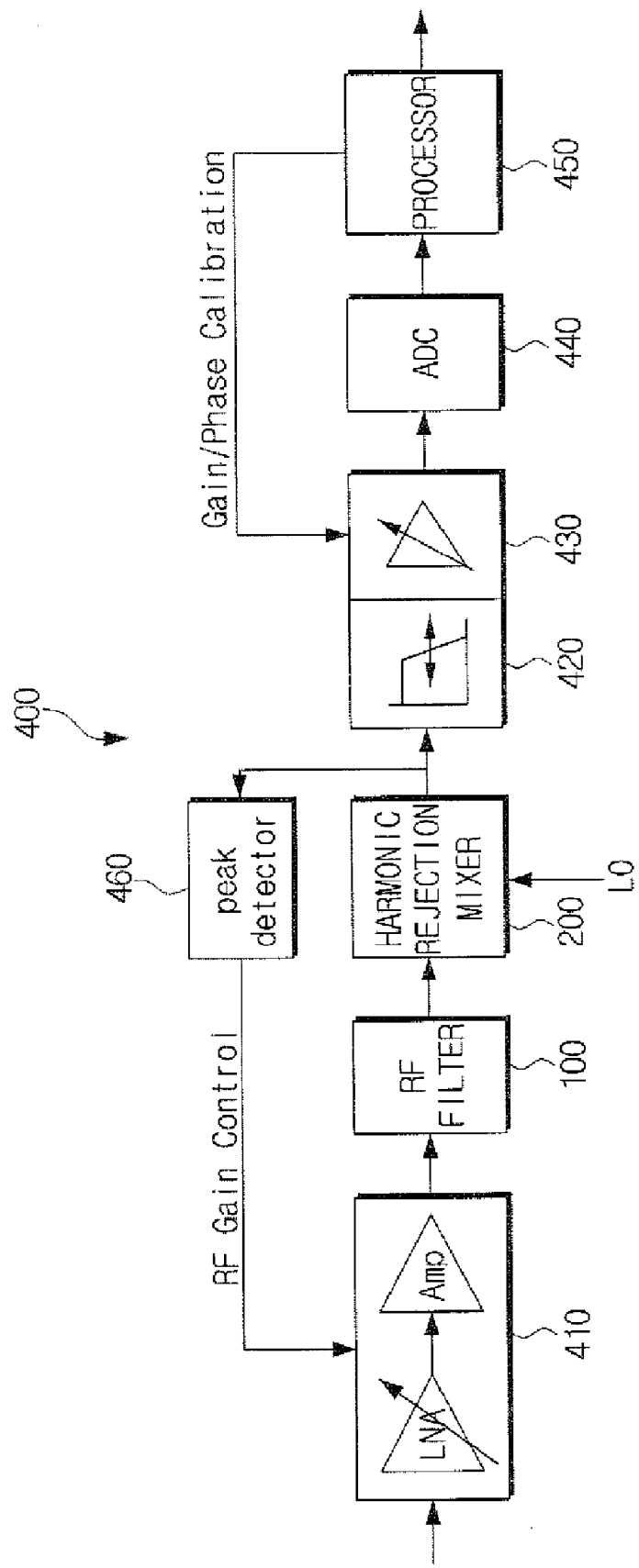
FIG. 13 is an exemplary block diagram illustrating a digital broadcast receiving tuner to which an RF filter according to an exemplary embodiment of the present invention is applied.

FIG. 13 is a block diagram illustrating the structure of a digital broadcast receiving tuner according to an exemplary embodiment of the present invention.

Referring to FIG. 13, a digital broadcast receiving tuner 400 according to an exemplary embodiment of the present invention includes an RF filter 100, a harmonic rejection mixer 200, a broadband amplifier 410, a filter 420, an intermediate-frequency auto gain controller (IF AGC) 430, an analog-to-digital converter (ADC) 440, a processor 450, and a peak detector 460.

The broadband amplifier 410 comprises a low-noise amplifier and an amplifier. When a TV signal input through an antenna is strong, the broadband amplifier 410 serves as an attenuator, and when a TV signal is weak, the broadband amplifier 410 serves as an amplifier to receive the whole band (about 48 MHz to 870 MHz) of the TV signal.

The RF filter 100 performs a band pass filtering process or an amplifying process on a signal input through the broadband amplifier 410 and outputs the processed signal to the next stage. In this case, when the input signal has a frequency equal to or lower than one-third of the maximum frequency of a reception band, the RF filter performs a band pass filtering on the input signal, and when the input signal has a frequency exceeding one-third of the maximum frequency, the RF filter performs an amplifying process. Any one of the RF filters shown in FIGS. 2 to 7 can be applied to the RF filter according to the present exemplary embodiment. In this case, each switch of the applied RF filter may be controlled by an additional controller (not shown).

The harmonic rejection mixer 200 mixes the output signal of the RF filter 100 with an LO spectrum to convert the output signal into an intermediate frequency (IF) signal, and outputs the IF signal.

The filter 420 performs a filtering process on the IF signal.

The IF AGC 430 automatically controls the gain or phase of a signal to be input to the ADC 440, thereby preventing the input signal of the ADC 440 from being saturated. The IF AGC 430 may detect the amplitude of a signal input to the processor 450 and use the detected amplitude to perform a gain or phase control.

The ADC 440 converts the input signal into a digital signal.

The processor 450 processes the digital signal output from the ADC 440 to generate an output signal. To this end, the processor 450 may include an image rejection filter that removes image data from the digital signal output from the ADC 440, a channel filtering filter that selects an accurate frequency channel, a digital up converter that converts a baseband digital signal into a digital signal of 44 MHz, a digital-to-analog converter that converts the digital signal of 44 MHz into an analog signal for National Television Standards Committee (NTSC), or the like.

The peak detector 460 detects the peak value of a signal output from the harmonic rejection mixer 200 and supplies the peak value to the broadband amplifier 410. Accordingly, the broadband amplifier 410 uses the peak value to adjust an RF gain, thereby being capable of operating as an attenuator or an amplifier as described above.

When the RF filter 100 is applied to a digital broadcast receiving tuner, it is possible to improve digital broadcast signal reception sensibility.

Figure 14:
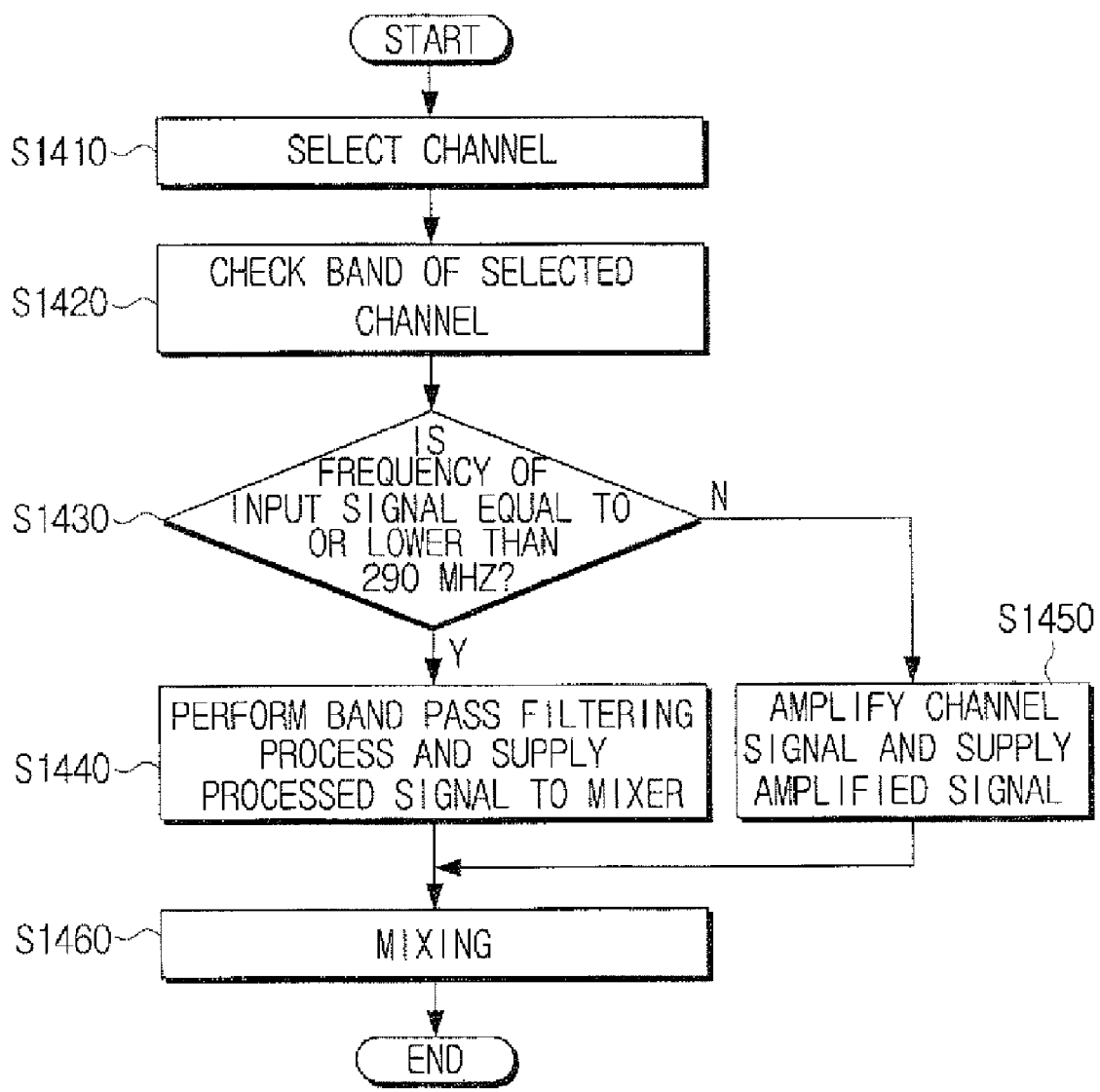
FIG. 14 is a flowchart illustrating an RF signal processing method of a digital broadcast receiving tuner according to an exemplary embodiment of the present invention.

FIG. 14 is a flow chart illustrating an RF signal processing procedure of the digital broadcast receiving tuner. Referring to FIG. 14, when a user selects a specific channel (S1410), a controller (not shown) checks the band of the selected channel (S1420) and controls the switching unit 130 of the RF filter 100. When an input signal has a frequency equal to or lower than 290 MHz (S1430-Y), a band pass filtering process is performed such that the harmonic components are removed from the input signal, which is supplied to the harmonic rejection mixer 200 (S1440).

When the input signal has a frequency exceeding 290 MHz (S1430-N), the input signal is amplified and supplied to the harmonic rejection mixer 200 (S1450).

The harmonic rejection mixer 200 mixes the input signal received through the RF filter 100 with an LO spectrum (S1460), thereby attenuating the harmonic components, and outputs an IF signal.

As described above, according to the exemplary embodiments of the present invention, the band pass filter unit or the amplifying unit is used to selectively process the input signal. Therefore, it is possible to improve the reception sensibility without filtering of the whole band of the signal. In particular, since it is unnecessary to use a structure, such as a phase-locked loop (PLL), it is possible to reduce the power consumption and size of the chip. Further, since all of the band pass filter unit, the amplifying unit, and the switching unit are integrated on one chip, it is possible to realize the RF filter in one chip without usage of various external elements. In other words, it is possible to provide a subminiature RF filter.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A radio frequency (RF) filter comprising:
a band pass filter unit which filters on an input signal;
an amplifying unit which amplifies the input signal; and
a switching unit which activates the band pass filter unit if a frequency of the input signal is equal to or less than a specific frequency, and activates the amplifying unit if the frequency of the input signal is higher than the specific frequency.

2. The RF filter as claimed in claim 1, wherein, if the frequency of the input signal is equal to or lower than one-third of a maximum frequency of a band which the RF filter can receive, the switching unit activates the band pass filter, and if the frequency of the input signal is higher than one-third of the maximum frequency, the switching unit activates the amplifying unit.

3. The RF filter as claimed in claim 2, wherein the one-third of the maximum frequency is about 290 MHz.

4. The RF filter as claimed in claim 1, wherein the switching unit comprises a first switch which switches a connection status of a first path in which the band pass filter unit is disposed, and a second switch which switches a connection status of a second path in which the amplifying unit is disposed.

5. The RF filter as claimed in claim 1, wherein the switching unit comprises:
a first switch which is disposed on an upstream side of the band pass filter unit along a first path in which the band pass filter unit is disposed;
a second switch which is disposed on a downstream side of the band pass filter unit along the first path;
a third switch which is disposed on an upstream side of the amplifying unit along a second path in which the amplifying unit is disposed; and
a fourth switch which is disposed on a downstream side of the amplifying unit along the second path.

6. The RF filter as claimed in claim 1, wherein the band pass filter unit comprises a plurality of band pass filters, and the switching unit selectively activates one of the plurality of band pass filters if the frequency of the input signal is equal to or less than the specific frequency.

7. A digital broadcast receiving tuner comprising:
a radio frequency (RF) filter which filters an input signal if a frequency of the input signal is in a first band, and amplifies the input signal if the frequency of the input signal is in a second band; and
a harmonic rejection mixer which mixes an output signal of the RF filter with a local oscillator spectrum.

8. The digital broadcast receiving tuner as claimed in claim 7,
wherein the RF filter comprises at least one band pass filter unit, an amplifying unit, and a switching unit which activates the band pass filter unit if the frequency of the input signal is in the first band, and activates the amplifying unit if the frequency of the input signal is in the second band, and
the harmonic rejection mixer mixes a signal output from one of the band pass filter unit and the amplifying unit with the local oscillator spectrum.

9. The digital broadcast receiving tuner as claimed in claim 8, further comprising a controller which controls the switching unit according to a channel which a user selects.

10. The digital broadcast receiving tuner as claimed in claim 7, wherein, if the frequency of the input signal is equal to or lower than one-third of a maximum frequency of a band which the RF filter can receive, the RF filter performs filtering, and if the frequency of the input signal is higher than one-third of the maximum frequency, the RF filter performs amplifying process.

11. The digital broadcast receiving tuner as claimed in claim 10, wherein the one-third of the maximum frequency is about 290 MHz.

12. The digital broadcast receiving tuner as claimed in claim 7, wherein the switching unit comprises a first switch which switches a connection status of a first path in which the band pass filter unit is disposed, and a second switch which switches a connection status of a second path in which the amplifying unit is disposed.

13. The digital broadcast receiving tuner as claimed in claim 7, wherein the switching unit comprises:
a first switch which is disposed on an upstream side of the band pass filter unit along a first path in which the band pass filter unit is disposed;
a second switch which is disposed on a downstream side of the band pass filter unit along the first path;
a third switch which is disposed on an upstream side of the amplifying unit along a second path in which the amplifying unit is disposed; and
a fourth switch which is disposed on a downstream side of the amplifying unit along the second path.

14. The digital broadcast receiving tuner as claimed in claim 7, wherein the band pass filter unit comprises a plurality of band pass filters, and the switching unit selectively activates one of the plurality of band pass filters if the frequency of the input signal is in the first band.

15. A radio frequency (RF) signal processing device comprising:
an RF filter which filters an input signal if a frequency of the input signal is equal to or less than a specific frequency, and amplifies the input signal if the frequency of the input signal is higher than the specific frequency; and
a harmonic rejection mixer which mixes an output signal of the RF filter with a local oscillator spectrum.

16. The RF signal processing device as claimed in claim 15,
wherein the RF filter comprises at least one band pass filter unit, an amplifying unit, and a switching unit which activates the band pass filter unit if the frequency of the input signal is equal to or less than the specific frequency, and activates the amplifying unit if the frequency of the input signal is higher than the specific frequency, and
the harmonic rejection mixer mixes a signal output from one of the band pass filter unit and the amplifying unit with the local oscillator spectrum.

* * * * *